United States Patent Office 3,578,532
Patented May 11, 1971

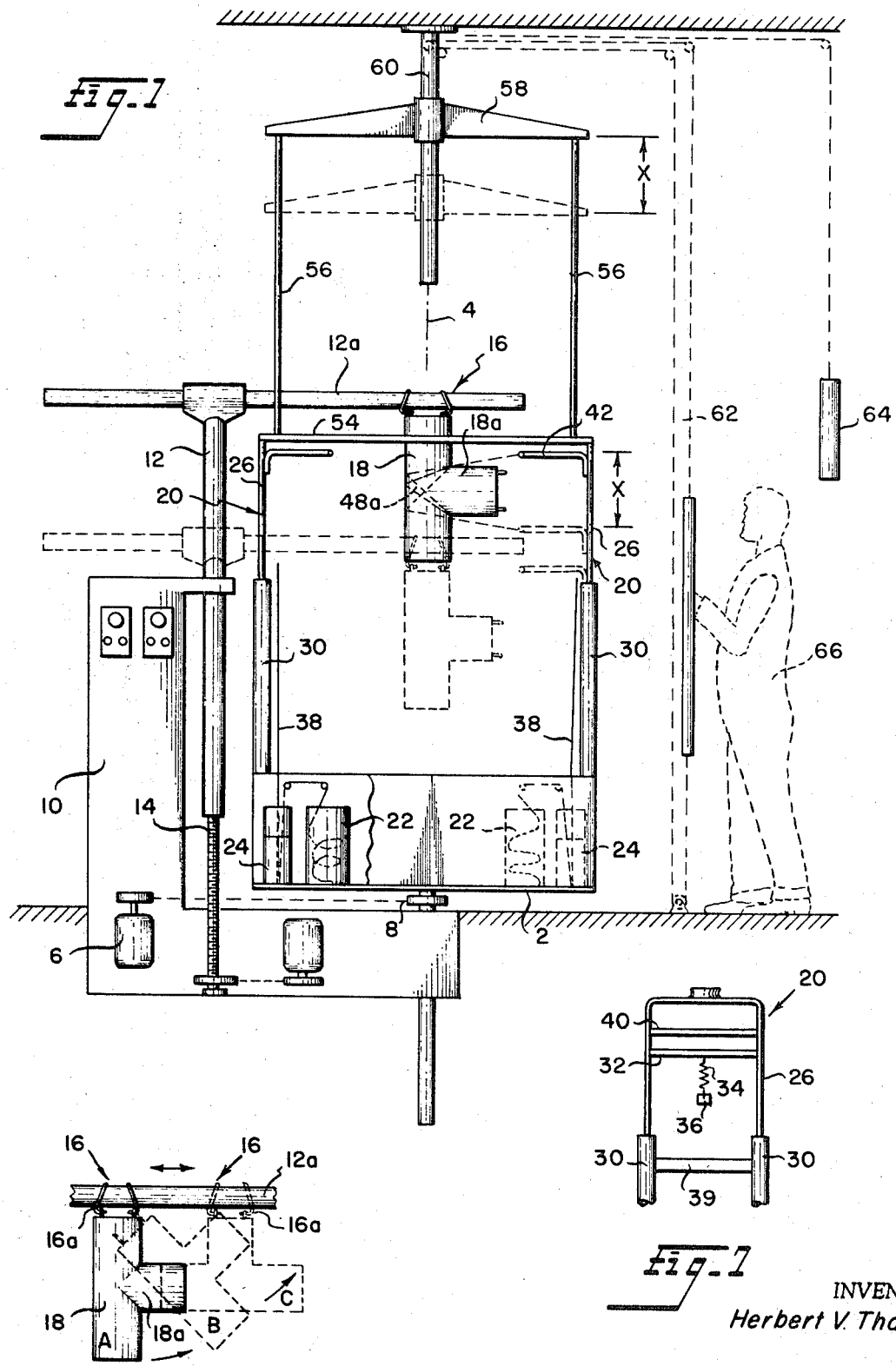

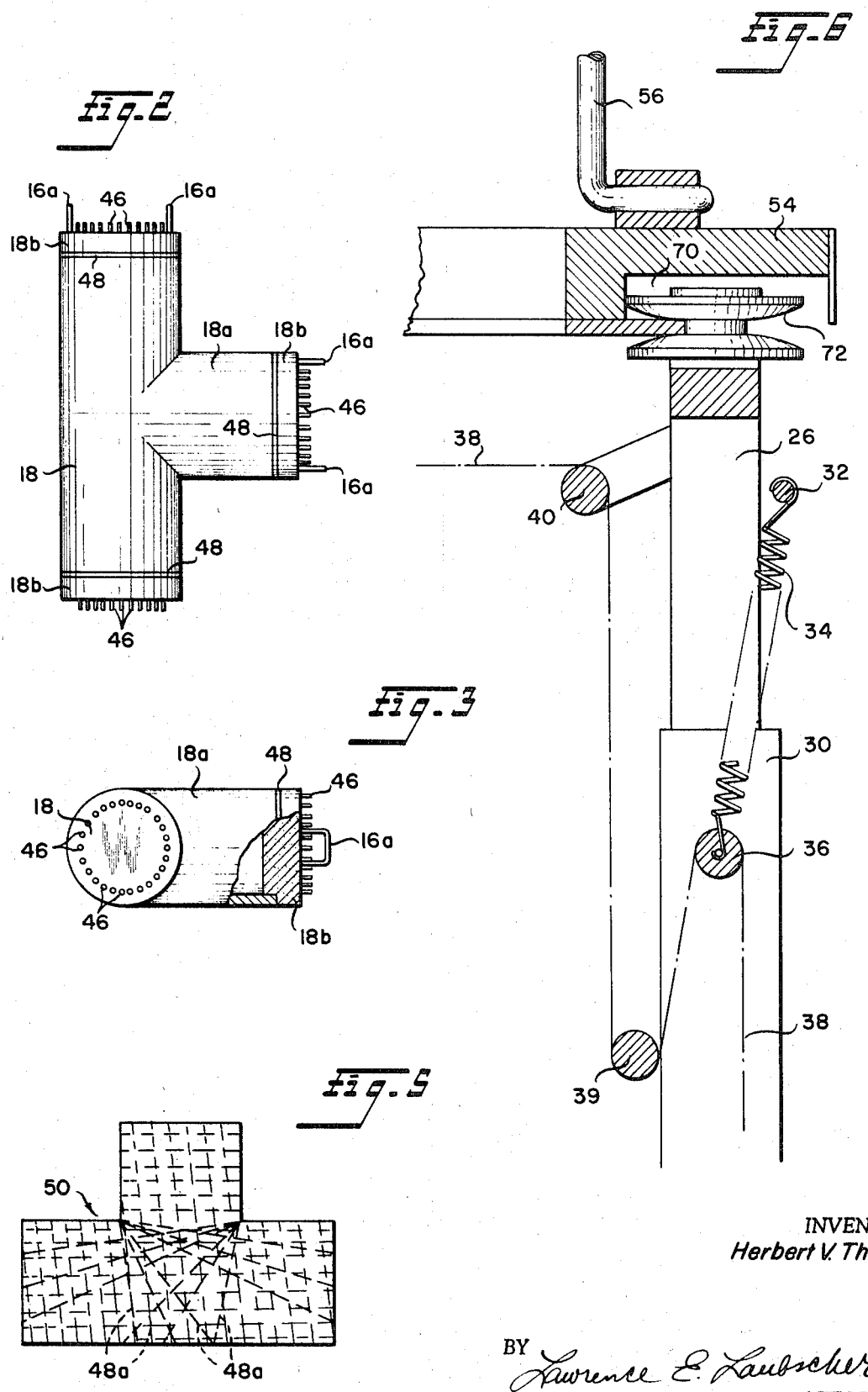

3,578,532
WINDING APPARATUS FOR FORMING T-SHAPED FITTINGS
Herbert V. Thaden, 1101 N. Main St., High Point, N.C. 27262
Filed Nov. 4, 1968, Ser. No. 772,924
Int. Cl. B65h *81/02;* B31c *1/00*
U.S. Cl. 156—431                                8 Claims

ABSTRACT OF THE DISCLOSURE

Winding apparatus for forming T-shaped fittings from continuous resin-impregnated glass fiber stock, characterized in that means are provided for winding "figure 8" turns about the crotch areas between the stem and arm portions of a T-shaped mandrel. In accordance with the invention, first control means are provided for vertically displacing the mandrel relative to the continuously driven winding table, and second control means serve to vertically adjust the roving guide means relative to winding table, whereby an improved structurally strengthened T-shaped object is produced.

In my prior U.S. Pat. No. 3,397,847 of Aug. 20, 1968, apparatus is disclosed for winding resin-impregnated glass fiber roving about an orbital mandrel to produce elbow-shaped fittings of various sizes. The present invention relates to a modification of, or an attachment for, the prior winding apparatus which modification is operable to wind resin-impregnated continuous glass fiber stock to form an improved structurally strengthened T-shaped fitting.

In the manufacture of T-shaped fittings from resin-impregnated continuous glass fiber stock, two major problems presented are the difficulty in accurately maintaining parallel the winding turns that extend longitudinally of the mandrel sections upon which they are wound, and the difficulty in winding and strengthening the crotch areas between the stem and arm sections of the mandrel. The present invention was developed to avoid the above and other drawbacks, and to provide improved winding apparatus by means of which extremely strong resin-impregnated glass fiber fittings may be produced.

Accordingly, the primary object of the present invention is to provide improved winding apparatus for forming from resin-impregnated continuous glass fiber stock T-shaped fittings having improved structural characteristics. More particularly, the invention is characterized by the provision of first control means for vertically displacing stationary mandrel means relative to continuously driven table means to effect helical and longitudinal winding of the stock about the stem and arm portions of the mandrel, and second control means for displacing vertically adjustable roving guide means relative to continuously driven table means to effect the figure 8 winding of turns about the crotch portions of a stationary mandrel.

A more specific object of the invention is to provide a T-shaped mandrel having snagger pins extending longitudinally outwardly from the extremities of each section thereof for snagging and maintaining parallel those turns that extend longitudinally of a mandrel section upon which they are wound. Consequently, when the mandrel is vertically reciprocated relative to the rotatably driven winding table by first control means, successive portions of the T-shaped mandrel are helically and longitudinally wound, respectively, in an extremely accurate manner.

A further object of the invention is to provide second control means operable—when the T-shaped mandrel is maintained stationary in a position in which the stem portion thereof is horizontal—to vertically displace the guide means relative to the rotatably driven table by which they are carried to effect winding of figure 8 turns upon the crotch portions of the mandrel. To this end, counterbalanced vertically reciprocable hoop means are provided for simultaneously reciprocating the guide means at a desired rate relative to the rotational speed of the table means.

Other objects and advantages of the invention will become apparent from a study of the following specification when considered in the light of the accompanying drawing, in which:

FIG. 1 is a somewhat schematic side elevational view, with certain parts broken away, of the improved winding apparatus for forming T-shaped fittings;

FIGS. 2 and 3 are side and end views of the T-shaped mandrel, respectively;

FIG. 4 is a diagrammatic illustration of the two winding portions of the mandrel as mounted on the mandrel support arm;

FIG. 5 illustrates the winding patterns of the roving on the T-shaped mandrel;

FIG. 6 is a detailed sectional view of the hoop means for adjusting the roving guide means; and FIG. 7 is a detailed elevational view of the roving guide means.

Referring first to FIG. 1, the winding machine of the present invention includes a rotary table 2 that is driven about a vertical axis 4 by drive motor 6 and belt and pulley means 8 as in my aforementioned prior Pat. No. 3,397,-847. Mounted for vertical sliding movement in the frame 10 is a mandrel support 12 that is vertically reciprocable by motor-driven jack screw means 14 between the illustrated uppermost position and the lowered position shown in phantom. The mandrel support means includes an adjustable horizontal arm 12a that carries on the vertical axis 4 by hook and pin means 16 a T-shaped mandrel 18. As shown in FIG. 4, the mandrel is mounted on the support arm 12a for adjustment between the illustrated first winding position *a* wherein the stem portion 18a of the mandrel is horizontal, an intermediate transport position B, and a second winding position C wherein the stem portion is vertical and the arm portions of the mandrel are horizontal.

Carried by the table 2 in a circular arrangement concentric with the vertical axis 4 are a plurality of guide means 20 to which roving is supplied from source 22 via the liquid resin-impregnating bath 24. Each of the guide means comprises a U-shaped metal upper part 26 having downwardly depending legs 28 that are slidably guided in a "trombone" fashion in vertical sleeves 30. Supported at one end by a bar 32 on the upper part 26 is a tension spring 34 that carries at its lower end a roving guide 36. The resin-impregnated roving 38 is fed upwardly from the batch 24, over the tension adjusting means 36, beneath the guide bar 39 secured to the vertical sleeves 30, upwardly over the guide bar 40 carried by the upper part 26, and radially inwardly toward the vertical axis 4. If desired, the tubular guide conduit 42 (FIG. 1) may be supported on the bar 40 to accurately guide the radial inward travel of the roving toward the mandrel.

Referring now to FIGS. 2 and 3, the mandrel includes a unitary hollow T-shaped body part the three open-ended portions of which are closed by end disks 18b. In the illustrated embodiment, the mandrel is of the withdrawable tubular section metal type, and the end disks are formed of plaster. Embedded in each plaster disk are a plurality of outwardly extending snagger pins 46 that maintain the longitudinally extending roving turns parallel with the sections on which they are wound. Embedded also in the stem disk and one of the arm disks are a pair of support hooks 16a that serve to connect the mandrel with the support arm 12a as shown in FIG. 4. As will be described below, when the winding of the roving on the mandrel has been completed, the product and mandrel are sawn along the trim lines 48 to remove the disks, pins and hooks from the mandrel body. Upon disassembly and withdrawal of the metal mandrel sections, the resultant T-shaped wound roving fitting 50 of FIG. 5 is obtained.

Referring to FIGS. 1 and 6, control means are provided for elevating the roving guides 20 relative to the table means 2. These guide control means include a horizontal hoop 54 that is carried by means of vertical rods 56 from a spider 58 that is vertically slidable on the stationary slide 60 by the pulley-guided endless cord means 62. Counterweight 64 is connected with the spider to balance the weight of the splider, hoop and rod means, whereby an operator 66 may quickly and accurately vertically reciprocate the hoop 54 by manual operation of the cord means 62. Referring to FIG. 6, it will be seen that the hoop 54 contains in its outer circumference a circular channel 70 that slidably receives the upper flanges of a plurality of pulleys 72 secured to the U-shaped upper guide members 26, respectively. Consequently, vertical reciprocation of the horizontal hoop 54 results in corresponding simultaneous vertical adjustment of the guide means relative to the table 2.

OPERATION

Assume that the mandrel support and hoop means are initially in the lowermost positions shown in phantom in FIG. 1, and that the table means 2 is continuously driven at a uniform speed. The roving stock is supported from the table-carried sources 22 through the impregnating baths 24, upwardly through the tensioning means 34–36, over the guide means 20, and radially inwardly toward the winding center line 4.

Upon operation now of the motor-driven jack screw means 14, mandrel support arm 12 and mandrel 18 are slowly displaced upwardly to effect, in succession, helical winding of the cylindrical lower arm portion of the mandrel, longitudinal winding of the stem portion 18a of the mandrel, and helical winding of the upper arm portion. The mandrel may be reciprocated vertically to repeat this winding operation (in the reverse sequence, of course) as many times as desired. During the winding of the longitudinal turns on the stem part of the mandrel, the snagger pins carried by the stem disk grasp the ends of the turns and maintain them parallel relative to the stem.

The mandrel is then pivoted from the winding position A to the winding position C (FIG. 4), whereupon the jack screw 14 is again operated to reciprocate the mandrel relative to the table and guide means. During this winding operation, longitudinal turns are wound on the arm portions of the mandrel (in parallel orientation as a consequence of the snagger pins extending from the arm disks), and helical turns are wound on the stem portion of the mandrel.

Upon completion of this winding step, the mandrel is returned to the position A on the support arm 12a, and the mandrel support is lowered to the lower position shown in phantom in FIG. 1, whereupon the vertical reciprocation of the mandrel support 12 and mandrel 18 relative to the rotatably driven table is terminated.

The operator now manipulates the cord 62 to vertically reciprocate the hoop 54 through the distance X relative to the rotatably driven table whereby the figure 8 turns 48a are wound between the crotch portions of the mandrel. It should be noted that in the event that roving is being supplied at this time by all of the guide means 20, it is possible that some turns will be wound longitudinally upon the stem portion 18a of the mandrel during the vertical reciprocation of the guide means. Of course, in some cases, it may be desirable to interrupt the supply of roving from certain of the guide means during the winding of the figure 8 turns. Although the vertical reciprocation of the hoop 54 has been illustrated and described as being performed manually by the operator, it is apparent that by the provision of appropriate programmed mechanical controls, this figure 8 winding of turns may be accomplished automatically, if desired.

Upon completion of the winding, the wound mandrel is removed from the arm 12a and the resin is permitted to harden. The end disks are then severed from the mandrel by sawing along the trim lines 48, and the remaining mandrel sections are removed in a conventional manner. The resultant wound glass fiber roving product then has the T-shaped configuration shown in FIG. 5.

In the winding of the product on the mandrel, it may be necessary in some cases to apply to the mandrel a strip of fabric or tape of unidirectional roving, and subsequently to overwind this strip with the biaxial polar machine winds.

As indicated above, the light forces and accelerations required to move the upper guide or trombone members 26 permits the roving winding pattern to be placed in a figure 8 or diagonal lay in one or two table revolutions. Obviously this lay or pattern could be automated and programed but experience to date indicates the practicality of making this wind by eye and manually. The "figure eight" wind normally represents only ten or fifteen percent of the total wind and further, the wind can be advantageously used for additional and final "touch up" purposes for increased esthetic appearance.

In the foregoing description, it is noted that the table level has been kept constant and the mandrel and trombone have been displaced vertically to effect the bipolar and "figure eight" winds. A possible alternative would be to keep the mandrel fixed and raise and lower the table over the entire dimensional range of the fitting to attain the required winding patterns. Another alternative, possibly more practical, would be to keep the table and mandrel fixed and raise and lower the trombone to attain the equivalent winding patterns.

While in accordance with the provisions of the patent statutes I have illustrated the best form and embodiment of the invention now known to me, it will be apparent to those skilled in the art that various changes may be made without deviating from the invention set forth in the following claims.

What is claimed is:

1. Winding apparatus for forming objects from resin-impregnated glass fiber roving, comprising
   table means (2) rotatably driven about a vertcal winding axis;
   a mandrel (18);
   mandrel support means (12) for supporting said mandrel at a position coaxial with said winding axis adjacent and spaced from said table means;
   a plurality of roving guide means (20) connected with said rotatably driven table in concentrically spaced relation about said vertical axis, respectively, said guide means being operable to guide the resin-impregnated roving in a horizontal plane radially inwardly toward said vertical axis for winding on said mandrel, each of said guide means being vertically adjustable relative to said table;
   first control means (14) for vertically displacing one of said table and mandrel support means relative to the other; and
   second control means (62, 58, 54) for simultaneously displacing all of said guide means in the vertical direction relative to said table means.

2. Apparatus as defined in claim 1, wherein said second control means is operable to relatively displace the table and guide means at a greater rate than the rate of displacement of said table and mandrel support means.

3. Apparatus as defined in claim 2, wherein said mandrel has a T-shaped configuration including a pair of orthogonally-arranged cylindrical portions; wherein said mandrel support means is operable to support said mandrel in a first position in which the stem portion of the T is horizontal, and a second position in which said stem portion is vertical; and further wherein said first control means is operable when the mandrel is in the first position to effect longitudinal winding of the roving about the stem portion and helical circumferential winding of the roving about the arm portions, said first control means being operable also when the mandrel is in the second position to effect longitudinal winding of the roving about said arm portions and helical circumferential winding of the roving about the stem portion.

4. Apparatus as defined in claim 3, wherein the mandrel includes at the free extremity of each portion thereof longitudinally extending pin means for maintaining the longitudinally extending roving turns in parallel orientation relative to that mandrel portion upon which they are wound.

5. Apparatus as defined in claim 4, wherein the mandrel includes a unitary body portion of one material, and severable end parts at the free extremities of each portion of the mandrel, said pin means being carried solely by said severable end parts.

6. Apparatus as defined in claim 3, wherein said second control means is operable, when the mandrel is in the first position, to vertically reciprocate said guide means at such a rate relative to said rotatably driven table to wind figure 8 roving turns between the crotch portions of the mandrel, thereby to strengthen the resultant product.

7. Apparatus as defined in claim 1, wherein said second control means comprises a horizontal hoop, fixed slide means supporting said hoop for vertical movement, and means connecting said hoop with said roving guide means so that vertical movement of the hoop effects simultaneous corresponding movement of all of said guide means.

8. Apparatus as defined in claim 1, and further wherein each of said guide means includes tension control means for maintaining constant the tension of the resin impregnated roving guided thereby.

References Cited

UNITED STATES PATENTS

| 2,878,038 | 3/1959 | Noland | 156—192X |
| 3,391,873 | 7/1968 | Hardesty | 242—2 |
| 3,397,847 | 8/1968 | Thaden | 156—189X |

BENJAMIN A. BORCHELT, Primary Examiner

J. M. HANLEY, Assistant Examiner

U.S. Cl. X.R.

156—172, 187; 242—7.23